United States Patent
Capio et al.

(10) Patent No.: US 8,095,646 B2
(45) Date of Patent: Jan. 10, 2012

(54) CONTENT ANCILLARY TO SENSORY WORK PLAYBACK

(75) Inventors: Oliver Capio, Sunnyvale, CA (US); Gary Zalewski, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 571 days.

(21) Appl. No.: 11/840,104

(22) Filed: Aug. 16, 2007

(65) Prior Publication Data

US 2009/0049092 A1    Feb. 19, 2009

(51) Int. Cl.
*G06F 15/173* (2006.01)
*G06F 15/16* (2006.01)

(52) U.S. Cl. ......... 709/224; 709/248; 709/231; 709/203

(58) Field of Classification Search .................. None
See application file for complete search history.

(56) References Cited

U.S. PATENT DOCUMENTS

| | | | |
|---|---|---|---|
| 6,330,595 B1 | 12/2001 | Ullman et al. | |
| 6,571,392 B1 | 5/2003 | Zigmond et al. | |
| 7,269,634 B2 * | 9/2007 | Getsin et al. | 709/217 |
| 7,673,316 B2 * | 3/2010 | Incentis Carro | 725/51 |
| 2002/0059597 A1 | 5/2002 | Kikinis | |
| 2004/0068750 A1 | 4/2004 | Maa | |
| 2004/0152513 A1 * | 8/2004 | Shimizu | 463/30 |
| 2005/0060741 A1 | 3/2005 | Tsutsui | |
| 2005/0210101 A1 * | 9/2005 | Janik | 709/203 |
| 2006/0031550 A1 * | 2/2006 | Janik et al. | 709/231 |
| 2006/0149813 A1 * | 7/2006 | Janik | 709/203 |

FOREIGN PATENT DOCUMENTS

| WO | 01/97495 A1 | 12/2001 |
|---|---|---|
| WO | 2007/032407 A1 | 3/2007 |

\* cited by examiner

*Primary Examiner* — John B. Walsh
(74) *Attorney, Agent, or Firm* — Steptoe & Johnson LLP

(57) ABSTRACT

An ancillary device is used to access content related to a sensory work during the playback of the sensory work. The ancillary device receives information related to the playback of a sensory work on a primary device, prepares content information related to the sensory work using the received information, presents the prepared content information using the ancillary device.

9 Claims, 2 Drawing Sheets

CONTENT ANCILLARY TO SENSORY WORK PLAYBACK

CROSS-REFERENCE TO RELATED APPLICATIONS

Aspects of this disclosure relate to co-pending U.S. application Ser. No. 11/679,059 filed Feb. 26, 2007 and titled "Variation and Control of Sensory Work Playback," which is hereby incorporated by reference.

TECHNICAL FIELD

Briefly, and in general terms, this disclosure relates to the distribution and use of content related to the playback of a sensory work on an ancillary device.

BACKGROUND

Movies, radio, television, and the like are much the same today as they were 25 years ago, typically delivering audio and/or video content such that each viewer or listener is exposed to roughly the same sensory experience. Technology has changed-televisions have higher resolutions, improved audio, and larger screens—however, the experience of watching television is much the same.

That is not to say that the television viewing experience has not changed at all. Devices, such as the digital video recorder, have enabled audiences to easily record programming for later viewing. This allows viewers more control over their program selection, as well as the ability to fast forward, rewind, or otherwise navigate through recorded programming. For example, a viewer may fast-forward through a commercial or other portion of a recorded program. Though the controls and interfaces are different, a digital video record merely reproduces the conventional television program in the manner that it was broadcasted or otherwise delivered to the digital video recorder. Thus, while the control experience may exhibit substantial improvements, the viewing experience is largely the same; little has been done to enhance or improve the audience's sensory experience. Thus, it is desirable to enhance the viewing experience of sensory works.

Additionally, the use of mobile devices such as cell phones, personal digital assistants, laptops, programmable remote controls, portable gaming platforms, and the like, has become prevalent. These devices are capable of displaying (or otherwise presenting) information to a user, and are widely carried and used by television, movie, and radio audiences, and the like. Many such devises are Internet-enabled, capable of fetching and displaying text and/or multimedia content. This disclosure discusses various techniques to use ancillary devices (such as, mobile devices and the like) to enhance the playback of sensory works.

SUMMARY

Generally, there is disclosed a method for accessing information in an ancillary device related to a sensory work during the playback of the sensory work. The method includes receiving information on an ancillary device related to the playback of a sensory work on a primary device, preparing content information related to the sensory work using the received information, and presenting the prepared content information using the ancillary device.

Generally, a server for providing content information related to the playback of a sensory work includes a data store of content information related to the playback of sensory works, a network interface, and a processor coupled to the network interface and the data store. The processor is configured to receive through the network interface a request from an ancillary device for content information related to the playback of one of the sensory works, to query the data store for content information corresponding to the one of the sensory works, and to send the corresponding content information to the ancillary device using the network interface.

Generally, an ancillary device operable to provide content related to a sensory work during the playback of the sensory work includes an interface for receiving information from a primary device, an output for presenting content related to the playback of a sensory work, and a processor coupled to the interface and the output. The processor is configured to receive information from the primary device using the interface, prepare content information related to the playback of the sensory work, and present the prepared content information using the output.

Generally, a primary device includes an interface for communicating with an ancillary device, a sensory work playback component to facilitate the playback of sensory works, and a processor coupled to the interface and the sensory work playback component. The processor is configured to send information regarding the playback of a sensory work by the sensory work playback component to the ancillary device using the interface to enable the ancillary device to present content related to the playback of the sensory work.

The details of one or more implementations are set forth in the accompanying drawings and the description below. Other features and advantages will be apparent from the description and drawings, and from the claims.

DETAILED DESCRIPTION

This disclosure sets forth various systems and methods to enhance a sensory work playback experience by providing content using an ancillary device that is related to the playback of a sensory work on a primary device. Consider, for purposes of example, a person watching a television show. Using the techniques and system described herein, the person's viewing experience may be enhanced by providing additional, ancillary content related to the television program to an ancillary device, such as, a mobile phone. During the television program, the person may view information related to the program on his or her mobile phone. For example, the mobile phone may provide information regarding the cast of the show, provide the opportunity to purchase items seen on the show, provide advertisements, provide targeted content based on the person's preferences, demographics, or behavior. Additional systems, implementations, and features are set forth below.

Figure 1:
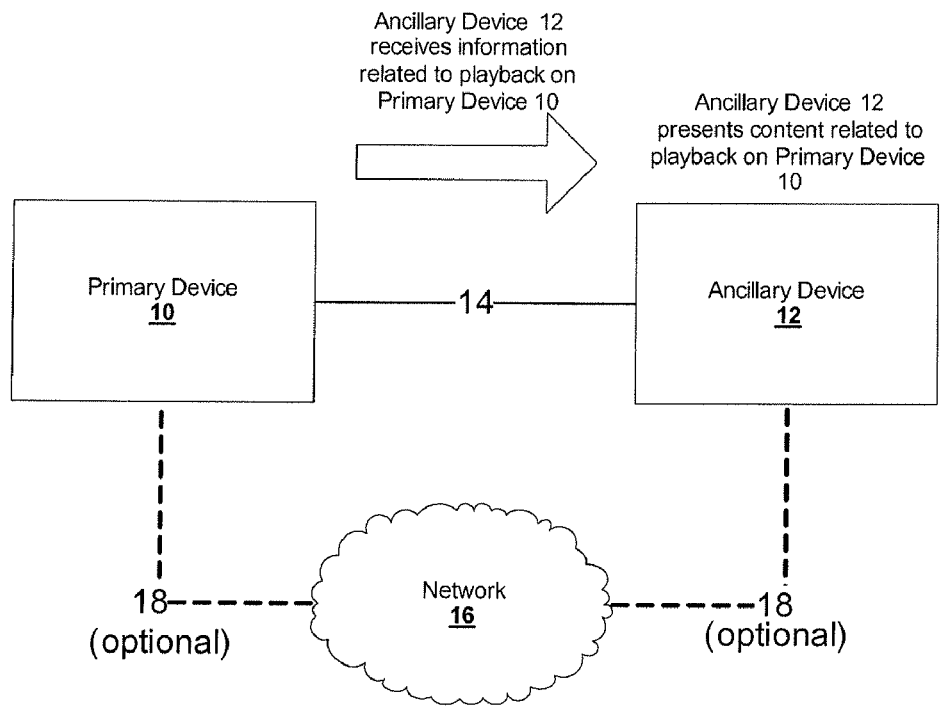
FIG. 1 is a diagram of a sensory work playback system having an ancillary device for presenting content related to sensory work playback on a primary device.

Referring to FIG. 1, a sensory work playback system includes a primary device 10, an ancillary device 12 operable to receive information through connection 14 from the primary device 10 related to the playback of a sensory work on the primary device 10. The ancillary device 12 uses the received information to present content that is related to the sensory work playback of the primary device 10. The primary device 10 and/or the ancillary device 12 optionally may be connected to a network 16 through a connection 18.

The most common sensory works in use today include audio recordings and motion pictures. However, as used herein, sensory work refers to any work fixed in a tangible form of expression usable by a sensory playback device to stimulate one or more senses, whether by electrical, mechanical, chemical, thermal, and/or biological mechanisms. It should be stated that a work "fixed" in tangible form may include dynamic content and blog material. Such material may be considered "fixed" with respect to the state and/or the content at any instant of time.

The following sensory works, provided for purposes of explanation, are not intended to be limiting:

1. Motion Pictures and Television Programs. Audiovisual works such as movies and television shows may be obtained from many sources. For example, they may be purchased or rented on Blu-ray Discs, DVDs, video tapes, Universal Media Discs (UMDs), and the like. In addition, they may be watched or recorded from cable, satellite, or over-the-air broadcasts, and stored for later playback. Also, they may be streamed or downloaded over a data network.

2. Music and Audio Books. Audio recordings of music and audio books are commonly available for purchase on tapes, CDs, DVDs, UMDs, Blu-ray Discs, and the like. Additionally, music and audio books may be streamed or downloaded using a data network. Finally, music and audio programming is commonly broadcast by radio stations, satellite radio companies, and by various entities on the Internet. Audio data may be stored in a wide variety of formats, such as, for example, Audio CD format, MPEG-1 Audio Layer 3 (MP3) format, Advanced Audio Coding (AAC) format, and the like.

3. iFIT Workouts. Certain exercise equipment, such as treadmills, exercise bikes, elliptical trainers, and the like have been enabled to receive signals from data cartridges, videotapes, audio recordings, DVDs, and the like to vary aspects of a workout. For example, an iFIT videotape can be used to control a treadmill—during an exercise session, such that a user views a video of a path through a scenic locale, and the speed, and level of incline are varied as the video is played.

4. Digital Books. Books may now be purchased entirely in electronic format for use on a computer, personal digital assistant (PDA), or an electronic device designed for this purpose. Images of pages in the digital book are displayed such that a reader may read just as with a conventional printed book, with certain added abilities to search, bookmark, annotate, and the like.

5. Internet. The Internet provides a source of a wide-variety of static and dynamic data. It may be desirable to vary a user's interaction with Internet websites and downloaded data based on defined metadata.

6. Entertainment Software. A wide-variety of devices support the execution and use of entertainment software, including computers, mobile phones, PDAs, entertainment platforms, and the like. Entertainment software may include, for example, video games, simulations, puzzles, amusements, and the like.

7. Emerging and New Formats & Technologies. Various new electrical and/or mechanical devices that now support or could foreseeably support the playback of sensory works 18 have emerged. For example, amusement rides, robotic massage chairs, laser light show devices, electronically-controlled holiday lighting, simulators, and the like.

One skilled in the art will appreciate that the systems and techniques described herein are applicable to any sensory work including those that stimulate one's senses of sight, smell, taste, touch, or hearing, and any combination thereof.

A sensory work output device is any apparatus operable to stimulate one's senses, whether by electrical, mechanical, chemical, thermal, and/or biological mechanisms. By way of example, and not by way of limitation, sensory work output devices include the following and the like: video display devices, such as televisions, monitors, display panels, whether standalone or embedded (e.g., a mobile telephone display, a portable DVD player, or a handheld video game unit); audio devices, such as speakers, headsets, and earphones; and tactile devices, such as virtual reality gloves, automated massage chairs, computer-controlled exercise equipment, simulators (e.g., flight simulators, firearm training simulators, driving simulators, and the like), and haptic devices (e.g., video game controllers). One skilled in the art will appreciate that the devices, systems, and techniques described herein are widely applicable to existing and future sensory work output technologies.

Both the primary device 10 and the ancillary device 12 may be implemented using any device operable to control a sensory work output device. By way of example, and not by way of limitation, primary device 10 may be embodied as a digital video recorder (DVR), video cassette recorder, digital entertainment center, cable box, computer, radio (either terrestrial or satellite), cassette player, digital music player, CD player, DVD player, Blu-ray Disc player, automated massage chair, electronically controlled exercise devices, personal digital assistants (PDAs), mobile phone, remote control, portable entertainment system (e.g., Sony PSP portable entertainment system, and the like), a computer entertainment system (e.g., Sony PlayStation 2 computer entertainment system, Sony PlayStation 3 computer entertainment system, and the like), digital book viewing devices, and the like.

While the ancillary device 12 may be implemented using any device that may be used for the primary device 10, in a preferred implementation, the ancillary device 12 is embodied as a portable device, such as, for example, a personal digital assistant, a portable entertainment system, a digital book viewing device, a mobile phone, and the like.

One skilled in the art will appreciate that the functionality of the primary device 10 and/or the ancillary device 12 may be spread across multiple devices. For example, some implementations of the ancillary device 12 may have insufficient processing power. In this situation, it may be advantageous to use an ancillary device 12 made of multiple devices, such as, for example, a mobile phone and a computer. This may be done for many reasons, including device limitations or constraints, implementation cost or efficiency, networking costs or bandwidth, latency control, and the like.

The primary device 10 and the ancillary device 12 are operable to communicate through connection 14. Connection 14 may be implemented using any networking technology such that the ancillary device 12 is operable to receive information from the primary device 10. To communicate, the primary device 10 and ancillary device 12 do not need to be on the same network or even use the same technology. The connection 14 may be bi-directional or may be uni-directional. In the case of a bi-directional connection 14, the link need not be symmetrical—the forward link from the primary device 10 to the ancillary device 12 may be implemented using completely different technology, network interfaces, and the like. Implementations of such sensory work playback systems include differing requirements, thus different implementations may benefit from using different technologies for connection 14.

Furthermore, the connection 14 does not need to be direct. For example, connection 14 may be implemented as a link to the Internet, and communication between the primary device 10 and the ancillary device 12 may be transferred through one or more intermediate devices, such as through an Internet server. In one implementation, connection 14 is embodied as a infrared link in the forward direction between the primary device 10 and the ancillary device 12, and as an Internet connection between the ancillary device 12 and the primary device 10. In other words, the connection 14 may include one or more links in the forward direction, one or more links in the reverse direction, and may encompass (or partially encompass) connection 18. In a preferred implementation, connection 14 is implemented using a local network technology, such as, for example, Ethernet, WiFi, Infrared, Bluetooth, and the like. For example, connection 14 may be implemented using a USB-connected Bluetooth radio. Furthermore, the connection 14 may be implemented indirectly (i.e., as a logical connection through one or more intermediate devices which may or may not add, modify, and/or transform transmitted information) instead of as a direct connection.

The primary device 10 and the ancillary device 12 optionally may be connected to a network 16. The network 16 may be implemented using any networking technology, such as, for example, any wide area network technology (e.g., the Internet, and the like), and/or any local area network technology (e.g., WiFi, Bluetooth, Ethernet, and the like). In a preferred implementation, network 16 is implemented as the Internet, and connection 18 may or may not serve as connection 14 (or as a component thereof).

The sensory work playback system of FIG. 1 is operable to present content related to the playback of a sensory work on the primary device 10 using the ancillary device 12. The connection 14 is used to provide information to the ancillary device 12, such that the ancillary device can present content related to the sensory work playback on the primary device 10.

Figure 2:
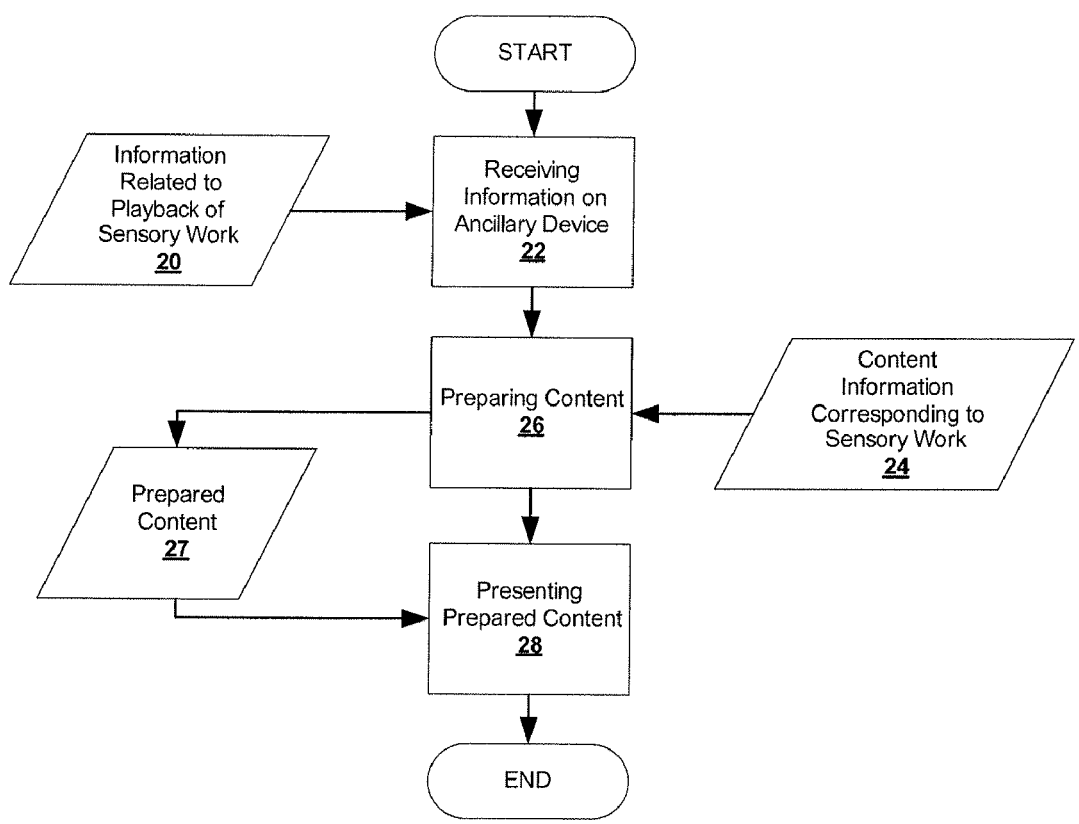
FIG. 2 is a flowchart of a method for providing content on an ancillary device that is related to sensory work playback on a primary device.

Referring to FIG. 2, a method for presenting content on an ancillary device 12 related to the playback of a sensory work on a primary device 10 includes receiving on an ancillary device information 20 related to the playback of a sensory work (process 22), using the received information 20 and content information 24 corresponding to the sensory work to prepare content (process 26), and presenting the prepared content 27 using the ancillary device (process 28).

The ancillary device 12 receives information 20 related to the primary device's 10 playback of a sensory work. This information 20 is typically received directly from the primary device 10 across connection 14, and the information 20 includes sufficient information such that the ancillary device 12 can prepare and present content (processes 26 and 28), such as one or more of the following: (i) an identification of a sensory work (e.g., the name of the sensory work, the episode number of the sensory work, a unique identification of the sensory work, a cryptographic identification of the sensory work, a hash, and/or the like); (ii) information to be presented by the ancillary device 12 (e.g., a URL, an image, a video, text, a data file, a document, and the like); (iii) an identification of a location within the sensory work (e.g., time information (either relative or absolute), chapter identification, title identification, a name, scene identification, and/or the like); and/or (iv) synchronization information.

The received information 20 may be communicated using any networking technology, such as, for example, the following:

1. Pull Method. Using a pull method, the ancillary device 12 sends a request whenever received information 20 is desired. Upon receive of an authorized request, the primary device 10 responds with the requested information 20.

2. Push Method. Using a push method, the primary device 10 periodically transmits the information 20, thus reducing network utilization.

Furthermore, any combination of the pull method and push methods (or any other network technique) may be used.

One way to ensure that the ancillary device 12 is in sync with the primary device 10 is to frequently poll the primary device 10. While this is effective, it uses substantial network and device resources compared to alternative methods. For example, once the ancillary device 12 and the primary device 10 are in sync, it polling interval may be substantially reduced. So long as the sensory work playback is progressing at normal speed, the ancillary device 12 can maintain synchronization. Using this technique, if the primary device 10 changes its speed, it then pushes information 20 to the ancillary device 12 to permit timely resynchronization. For example, if the user pauses the playback of a sensory work, the primary device 10 notifies the ancillary device 12 of the change.

Using the received information 20 and content information 24 corresponding to the sensory work, the system prepares the content (process 26) such that it can be presented. The steps used to prepare content for presentation typically vary depending on the nature of the received information 20. For example, the content information 24 may be received as part of the received information 20, received across a connection 14 or 16, or received by accessing a local file system, database, or other application. The content information 24 may include static data (though it may have been dynamically generated before its delivery), dynamic data providing information to be used by the ancillary device 12 to dynamically generate content, or any combination thereof. Finally, the prepared content 27 is presented (28) by the ancillary device 12. Any presentation technique may be used including, but not limited to, the following: displaying the content; playing the content using audio speakers; printing the content; projecting the content; and/or forwarding the content. One skilled in the art will appreciate that there are many technologies that may be used to prepare and present information.

These concepts may be better understood through a series of examples. The following implementations are provided by way of example only, and are not intended to be limiting:

1. Movie Playback Enhancement. During the playback of a movie, the system may present any content related to the move using the ancillary device 12, such as, for example, (i) IMDB information; (ii) reviews of the movie; (iii) information regarding the displayed portion of the movie, such as the actor; (iv) identification or listing of items seen in the movie that are for sale (e.g., a mobile phone, clothes, accessories, furniture, devices, or any other portrayed item); (v) information regarding upcoming scenes; (vi) advertisements, and the like.

2. Entertainment Software Enhancement. When playing a game, or executing other entertainment software, the system can present content related to the entertainment software using an ancillary device 12. This is much the same as the example given above for movies; however, video games are typically interactive, such that a user may greatly affect playback. In this situation, time indicators may become ineffective in maintaining synchronization; however, push and pull methods discussed above may still be employed to maintain sufficient synchronization. For example, a game may be implemented such that content only changes once each level, or after a predetermined time interval. A push method is typically effective in updating and revising content presented by an ancillary device for entertainment software and other applications where time is not effective for synchronization.

In some implementations, content related to video game play is presented by an ancillary device 12. When a user encounters predetermined milestones within the game (e.g., completion of a level, elapse of time, winning a fight or game, and the like), the primary device 10 sends information 20 to the ancillary device 12.

3. Television Enhancement. Television programming may be enhanced in the same manner as movies; however, when a digital video recorder is in use, a user may pause, rewind, fast forward, and/or skip through commercials. When such an event occurs, the primary device 10 may notify the ancillary device 12 of the event, such that synchronization may be maintained. Furthermore, some implementations present advertising content using the ancillary device 12 in the event that a user fast forwards or otherwise skips a commercial. The advertising content may be related to the skipped commercial, it may be unrelated advertising, or it may be targeted based on information, such as, for example, demographics, income, purchase history, behavior, and the like.

Figure 3:
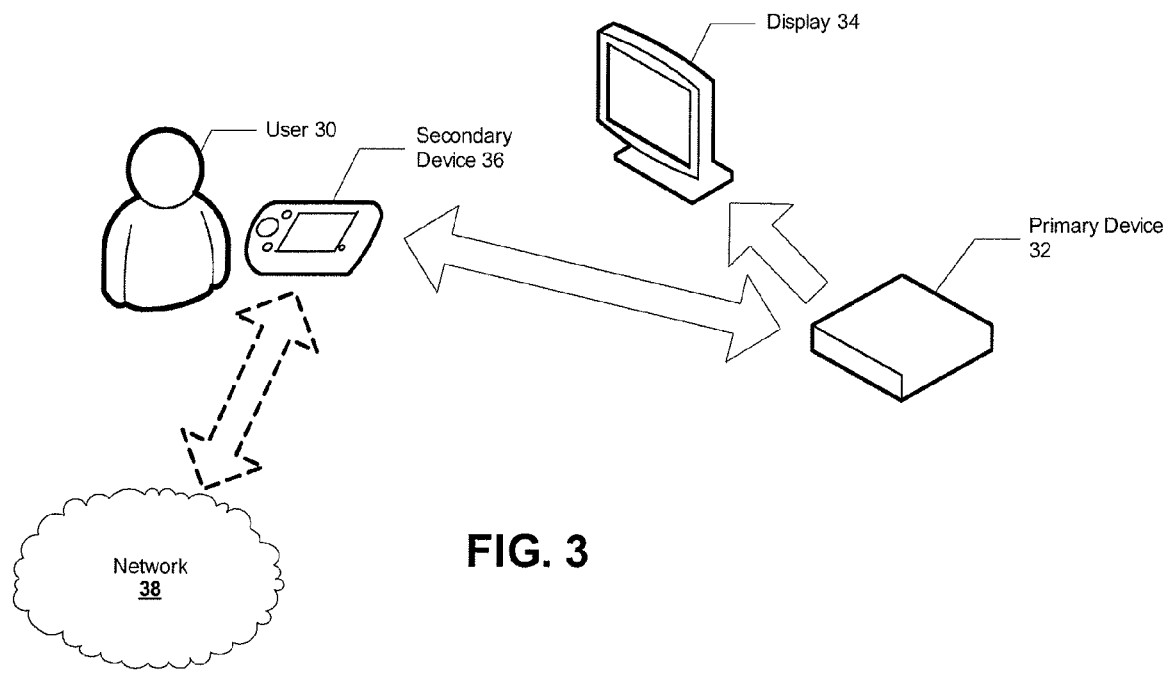
FIG. 3. is a diagram of an audio/visual display system having both a primary device and an ancillary device.

FIG. 3 depicts a specific implementation of the sensory work playback system. In this implementation, a user 30 watches the playback of a movie using a primary device 32 which outputs audio/visual information through a display 34. In this implementation, the primary device 32 is a Sony PlayStation 3 computer entertainment system. In addition, the user 30 uses a secondary device 34 which serves as an ancillary device 12 to obtain additional content related to the playback of the movie. In this implementation, the secondary device 34 is a Sony PlayStation Portable entertainment system. Content may be obtained through a network 38, such as, for example, the Internet.

This implementation may be used for the playback of a Blu-ray movie. For example, during the playback of the Matrix, the secondary device 34 may be used to identify sunglasses worn by a character, such as, Neo. The content may be presented on a Sony PSP as a link or as a web browser opened to the link.

Figure 4:
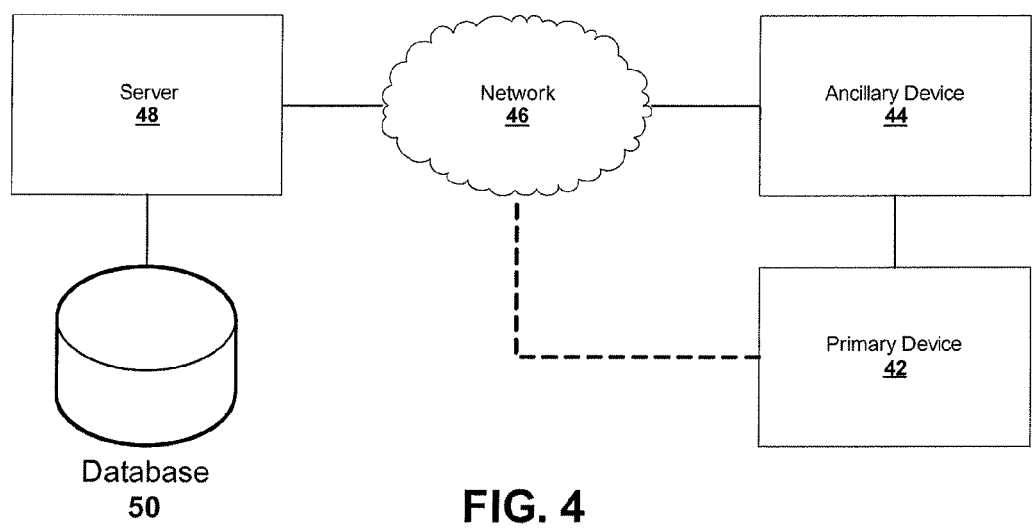
FIG. 4 is a network diagram of a sensory work playback system.

Referring to FIG. 4, some implementations of a sensory work playback system include a primary device 42 operably linked to an ancillary device 44. The ancillary device 44 is connected through a network 46 to a server 48, which is operably linked to a database 50. This implementation may be used to create a community, whereby users may share content and/or information used to prepare content for presentation by the ancillary device 44. Prepared content presented by the ancillary device 44 is related to the playback of a sensory work using the primary device 42.

Community

A plurality of users forms a "Community." Within the Community, the users have access to a sensory work, such as, for example, an audio recording, a movie, television show, a work with tactile elements, light show, and the like. A sensory work may be of any form and from virtually any source. In addition, users can access content information 24 provided by, modified by, and/or influenced by other users within the community.

More particularly, and by way of example and not by way of limitation, users within the Community have access to a sensory work. For example, users may have access to the most recent Super Bowl game footage. This game footage may be provided for access such that each user has the same sensory work or a copy of the same sensory work, or users may obtain the sensory work through other means (e.g., from broadcast television, cable, Internet, or satellite). Users within the Community can define and submit content information 24 to vary and or control the presentation of content on ancillary device 12. Many ancillary devices 12 have limited user interfaces, thus making it difficult to interactive with the Community. In this case, online access to the Community may be provided such that the user may, more effective, interactive.

Such a system, as described above, provides an enhanced and creative environment for users to join together with common interests and to individually or jointly develop creative content common to or associated amongst all the users. This provides not only excitement and amusement, but also a forum to express ideas and interest. Such an environment further provides for a means to track user interest and preferences so that the Community and/or third parties can track and provide information that is tailored to the users and the Community within the data and media.

In one implementation, a collaborative community facilitates the creation, sharing, and use of content related to the playback of a sensory work. In this particular example, the community is supported by the insertion of profile-based advertising during the playback of the sensory data.

The system provides a mechanism to assist users in identifying the "best" contributed ancillary content for their purposes. For example, one mechanism that may be used is to allow users to rate content contributions.

Some implementations enable profile-based advertisement swaps such that targeted advertisements may be inserted during playback of sensory data (either on the primary device 10 or the ancillary device 12). To determine which advertisement to insert, the system may use any available information, such as, for example, user preferences, account data, census data, demographics, user ratings, past participation in the community, and the like.

The above applications are merely examples and by no means intended to limit the scope of the disclosure and technology. The above techniques may be used either singly or in any combination together with similar techniques to improve download times of network-delivered entertainment software. A number of implementations have been described. Nevertheless, it will be understood that various modifications may be made without departing from the spirit and scope of the invention. Accordingly, other implementations are within the scope of the following claims.

What is claimed is:

1. In an ancillary device, a method for enhancing sensory work playback, the method comprising:

receiving on an ancillary device synchronization information from a primary device related to the playback of a sensory work on the primary device, the primary device being connected to a sensory work output device;

requesting, via the received synchronization information from the primary device, community-based content information related to the sensory work from a server;

in response to the request, receiving community-based content information related to the sensory work;

preparing content information based on the received community-based content information; and presenting the prepared content information using the ancillary device to enhance sensory work playback by the primary device through the sensory work output device.

2. The method of claim 1, wherein presenting the prepared content information using the ancillary device includes one or more from the group consisting of:
- displaying text;
- displaying an image;
- displaying video; and
- playing audio.

3. The method of claim 1, further comprising the ancillary device sending a request for information to the primary device.

4. The method of claim 3, wherein communication between the ancillary device and the primary device is used to maintain synchronization with sensory work playback on the primary device.

5. The method of claim 1, wherein receiving on an ancillary device information from a primary device related to the playback of a sensory work on the primary device includes receiving information upon the occurrence of an event including one or more from the group consisting of:
- initialization;
- playback disruption; and
- playback modification.

6. An ancillary device operable to provide content related to a sensory work during the playback of the sensory work, the device comprising:
- a first interface that receives synchronization information from a primary device related to the playback of a sensory work on the primary device, the primary device being connected to a sensory work output device;
- a second interface that communicates with a server to request, using the received synchronization information from the primary device, information related to the playback of the sensory work;
- an output for presenting content related to the playback of a sensory work based on the information received from the server; and
- a processor coupled to the first interface and the output, the processor configured to receive information from the primary device using the first interface, prepare content information related to the playback of the sensory work, and present the prepared content information using the output to enhance sensory work playback by the primary device through the sensory work output device, wherein the received information includes community-contributed content.

7. The ancillary device of claim 6, wherein the first interface is a network interface.

8. The ancillary device of claim 6, wherein the output is one or more from the group consisting of:
- a display;
- a speaker;
- a haptic device; and
- a light.

9. The ancillary device of claim 6, wherein the first interface that receives information from a primary device related to the playback of a sensory work on the primary device, and the second interface that communicates with a server to request, using the received information from the primary device, information related to the playback of the sensory work, are each provided by a using a single network interface device.

* * * * *

UNITED STATES PATENT AND TRADEMARK OFFICE
CERTIFICATE OF CORRECTION

PATENT NO. : 8,095,646 B2
APPLICATION NO. : 11/840104
DATED : January 10, 2012
INVENTOR(S) : Oliver Capio et al.

It is certified that error appears in the above-identified patent and that said Letters Patent is hereby corrected as shown below:

Column 1
In line 24, after "changed" remove "-" and insert -- — --

Column 6
In line 6, replace "receive" with --receipt--

Column 6
In line 40, replace "(28)" with --28--

Column 8
In line 8, replace "interactive" with --interact--

Column 8
In line 10, replace "interactive" with --interact--

Signed and Sealed this
Twenty-seventh Day of March, 2012

David J. Kappos
*Director of the United States Patent and Trademark Office*